Oct. 20, 1942.  H. Z. GORA  2,299,068
TIRE VALVE
Filed July 24, 1940
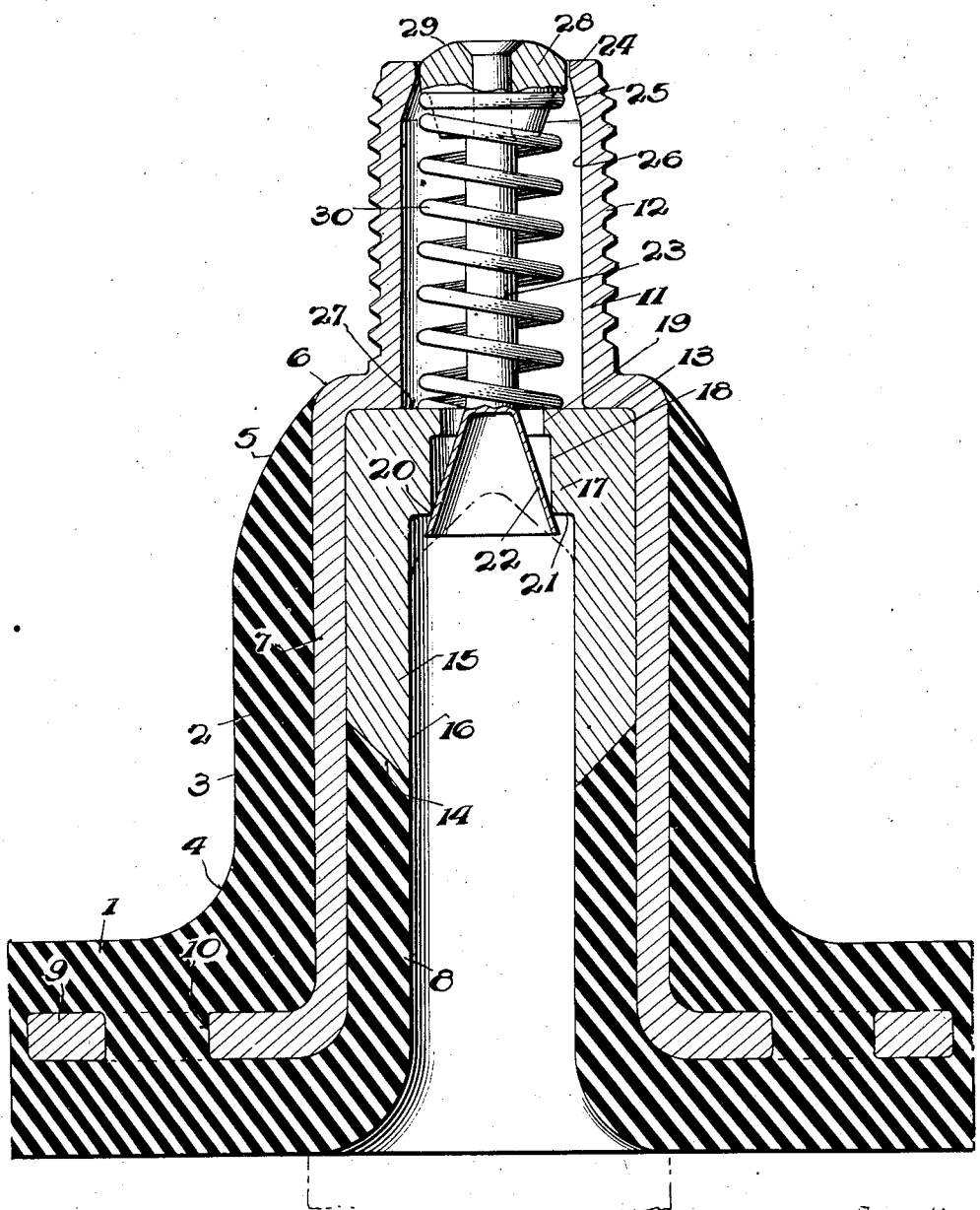
Inventor
Henry J. Gora.
By Cameron, Kerkam + Sutton
Attorneys Patented Oct. 20, 1942

2,299,068

UNITED STATES PATENT OFFICE 2,299,068

TIRE VALVE

Henry Z. Gora, Bridgeport, Conn., assignor to Jenkins Bros., New York, N. Y., a corporation of New Jersey Application July 24, 1940, Serial No. 347,320

5 Claims. (Cl. 152—430)

This invention relates to valve stems, and more particularly to rubber valve stems for heavy duty service as encountered with the tires of trucks, buses, and the like.

It has heretofore been proposed to provide a valve stem for heavy duty service on trucks, buses and the like which is composed of a relatively short rubber body portion provided with a metal reenforcement embedded in the rubber and extending the full length of the stem, said stem having a valve seat of rubber formed by constricting the passage through said body portion. Valve stems of the character under discussion when applied to heavy duty service as aforesaid are frequently located closely adjacent to the brake drums, so that the heat from such drums may in severe cases cause the rubber of the stem to become so highly heated as to affect the capacity of the rubber valve seat to maintain, in conjunction with the valve member, the airtight seal required for pneumatic tire service.

It is an object of this invention to provide a valve stem of the type referred to which overcomes the foregoing difficulty by providing a metal to metal contact to effect the airtight seal while at the same time retaining the numerous advantages of the relatively short valve stem heretofore proposed.

Another object of this invention is to provide a valve stem of the type last referred to, wherein a metal to metal contact is employed for effecting the air seal while at the same time are retained some if not all of the advantages implicit in a rubber valve seat due to its capacity to conform itself to such irregularities and variations of dimension as fall within the permissible tolerances of manufacturing operations.

Another object of this invention is to provide a valve stem of the type characterized which avoids the necessity for a cap threadable on the end of the stem and which at the same time may provide for attachment of a pump fitting or the like to a projecting metal extension of the stem.

Another object of this invention is to provide a valve stem of the type characterized which has provision for sealing the end of the passage therethrough against admission of dust, moisture, etc., without the necessity of using a removable cap.

Another object of this invention is to provide a valve stem of the type characterized which is in the form of a straight short stem that may be readily accessible for inflation, even though disposed on the inner tire of a double tired wheel.

Another object of this invention is to provide a valve stem of the type characterized which is so proportioned as to enable the stem to withdraw readily through the rim opening, so as to avoid damage to the tube when a puncture or blowout occurs in service.

Another object of this invention is to provide a valve stem of the type characterized which utilizes a metal to metal contact where the valve member engages the valve seat and which at the same time is of such construction that the desired airtight seal is effected without grinding or lapping of the metal parts.

Another object of this invention is to provide a valve stem of the type last characterized which is so constructed as to compensate for slight irregularities in the seating contours.

Another object of this invention is to provide a valve stem of the type characterized which is capable of withstanding relatively high temperatures and relatively severe and frequent changes in temperature without loss of the initial airtightness.

Other objects will appear as the description of the invention proceeds.

The invention is capable of receiving a variety of mechanical expressions, one of which is shown on the accompanying drawing. It is to be expressly understood, however, that the drawing is for purposes of illustration only and is not to be construed as a definition of the limits of the invention, reference being had to the appended claims for that purpose.

In the drawing the figure illustrates an axial section of a valve stem embodying the present invention.

As shown the valve stem includes a base flap 1 and a shaft or body portion 2 which projects from said flap and is ordinarily formed integrally therewith. If the stem should be formed integrally with a pneumatic tube, however, the flap as such would be omitted, the tube wall replacing the flap. Said base flap may be of circular or elliptical or other suitable shape as preferred, and it may extend to a margin which is beveled to a feather edge as understood in the art.

Shaft 2 comprises a substantially cylindrical or slightly tapered portion 3 which merges into the flap 1 by a fillet 4 and which at its outer extremity is smoothly curved at 5 so as to merge into the shoulder 6 of the insert 7 next to be described.

Molded into and preferably vulcanized to the body portion 2, preferably approximately midway between its outer surface and the surface of the passage 8 therein, is the aforesaid metal insert 7. Said insert is of generally cylindrical form throughout the major portion of its length and at its inner end it is provided with an outwardly extending flange 9 which is preferably provided with apertures 10 so that the rubber of the base flap 1 may be integrally united through said apertures to securely retain the insert in the rubber body. Toward its outer end said insert 7 is reduced in cross section so as to provide the relatively abrupt shoulder 6 before referred to, and projecting beyond said shoulder 6 said insert preferably has a nipple portion 11 of suitable length and form for the attachment of a pump fitting or other suitable coupling so that a source of pneumatic pressure may be readily attached to and detached from the same when the tire is to be inflated. As shown said nipple 11 is provided with exterior threads 12 for the attachment of the pump fitting or the like, but it is to be expressly understood that any other suitable formation of the nipple 11 may be employed, depending upon the type of coupling to be used. Also it is to be expressly understood that the threaded nipple is not for use with a removable cap, as in prior practice, as such a cap is unnecessary with the present invention as will hereinafter appear. While the projecting nipple 11 is preferred it is within the contemplation of the broader aspects of this invention to omit the same where a shorter stem is desired, the insert then terminating at the shoulder 6 and the rubber body portion being smoothly curved to the end surface of the stem.

The portion of the rubber body 2 interiorly of the insert 7 terminates between the ends of the embedded cylindrical portion of said insert, and disposed within said cylindrical portion of the insert and occupying the remainder of the space between the inner shoulder 13 of said insert and the extremity 14 of the rubber within said insert, is a metal sleeve 15 which tightly fits the bore of the insert 7 and is preferably made as a driven fit therewith. Sleeve 15 preferably has its inner bore 16 flush with the inner surface of the rubber in the passage 8; and its junction with the rubber is preferably at a beveled surface as shown at 14. Said junction of the metal and rubber at 14 is shown at approximately midway of the length of the cylindrical portion of the insert 7, but such is not essential as the sleeve 15 may be made longer or shorter than illustrated without departing from the present invention. Insert 15 is preferably driven into the bore of the insert 7 and then the rubber of the body portion of the stem is molded about the insert so as to embed the insert with its sleeve therein, to become integrally interlocked therewith and vulcanized thereto.

Adjacent its outer end sleeve 15 has an inwardly directed flange 17 to provide an opening 18 therethrough, said opening being further reduced at 19 if desired. Said inwardly directed flange 17 provides a valve seat at 20 formed by the intersecting surfaces of the aperture 18 and the shoulder 21. Said valve seat may provide a line contact, or it may be slightly rounded or beveled so as to produce a narrow zone of contact with the valve member to be described, but in either event it provides a substantially line contact with the valve member and will be so referred to hereinafter.

The valve member 22 takes the form of a hollow conical metal element formed integrally with or suitably attached to a valve pin 23 extending outwardly therefrom. Valve member 22 has its outer surface of such taper or angularity that it makes a substantial angle with the walls of the aperture 18 and shoulder 21, to the end that it engages the sleeve 15 only at the substantially line contact provided by the seat 20. At its inner end said valve member is of such diameter that it is appreciably larger than the diameter of the valve seat 20 so that even under the air pressure and the wear of continued service valve member 22 cannot be forced through the valve seat 20.

The wall of the conical valve member 22 is made relatively thin so that it possesses sufficient flexibility to yield and conform itself to irregularities in the valve seat 20. While the thickness of the valve member that will function as described to yield and maintain an airtight seal with the seat 20 may be varied depending upon the size of the stem and the air pressure to be retained, experience has demonstrated that if the wall is made on the order of .005 inch in thickness said valve member possesses such flexibility that with the size of stem and magnitude of air pressure now commonly used with the tires of trucks, buses, and the like, said valve member will yield sufficiently to compensate for such irregularities as exist by reason of manufacturing tolerances or arise from wear, so that a substantially airtight seal is effected for long service. The valve seat and valve member may be made of any suitable metal, such as brass, but it is not essential that they be made of the same metal, although it is preferred that both be composed of substantially the same metal so as to have substantially equal coefficients of expansion and contraction.

Nipple 11 at its outer extremity is provided with a central aperture 24, and inwardly of said aperture the bore of said nipple is enlarged by a beveled surface 25 which connects said aperture 24 with the main and generally cylindrical portion 26 of the bore through said nipple. Said bore is of larger diameter than the aperture 18, 19, through the sleeve 15 so as to provide a shoulder 27 which constitutes a spring seat. Suitably formed on or attached to the outer end of the valve pin 23 is a head 28 that substantially fills the aperture 24, preferably leaving only a sliding clearance therebetween, said head being shown as provided with a curved outer face 29. Interposed between said head 28 and the shoulder 27 is a coil spring 30 which seats on said shoulder 27 and urges the valve member 22 into closed position, in which position the head 28 may slightly project beyond the upper end of the nipple 11.

When the tire is to be inflated a fitting on a pneumatic line from the pump or other source of pneumatic pressure may be attached to nipple 11, as by the threads 12, while the conventional pin on the fitting will engage the head 28 and move the same inwardly against the tension of the spring 30, simultaneously moving the valve member 22 away from its seat 20. Owing to the enlargement of the bore through the nipple due to the beveled surface 25 air may readily flow past the head 28 and into the tire through the passage 8. When the fitting is removed spring 30 moves the valve member 22 into engagement with its seat 20 while the head 28 is returned to the position shown in the drawing wherein it substantially fills the aperture 24 preventing ingress of dirt, moisture and the like, so that a cap on the end of the nipple becomes unnecessary. Valve 22 under the action of the spring 30 and the air pressure acting on the inner face of the conical valve member 22 tightly engages the seat 20, the flexible wall of said valve member engaging the substantially line contact of the valve seat 20 and yielding to conform thereto so as to assure an airtight closure therewith notwithstanding such variations and irregularities as may exist because of manufacturing tolerances or subsequent wear.

The overall length of the valve stem is preferably such that only the nipple 11 projects beyond the rim. In the event of a puncture, the relatively short stem so provided will withdraw readily through the aperture in the rim, and not hang thereon, avoiding injury to the tube. The short stem is also readily accessible for attachment of inflating means even though it be on the inner tire of a double tired wheel.

Owing to the metal to metal contact thus provided between the valve member and its seat the relatively severe and at times relatively rapid fluctuation of temperature which may exist at the valve stem, particularly due to radiation from the brake drums in such heavy duty service as occurs with trucks, buses, and the like, do not result in deterioration of with eventual leakage at, the valve seat such as has been found to occur under extreme and severe conditions where the valve seat is made of rubber. Furthermore both the valve seat and the valve member expand at substantially equal rates, and hence the fluctuations of temperature occurring thereat are compensated by the concomitant expansion or contraction of the two coacting elements. At the same time the ready flexibility of the valve member provided in accordance with the present invention enables an airtight seal to be effected notwithstanding irregularities and variations as hereinbefore referred to, and hence the advantages obtained through use of a rubber valve seat have been retained. At the same time the valve stem requires no external cap that may hang on the rim aperture in the event of puncture, or which is likely to become lost so that proper exclusion of dust and moisture is no longer effected, while the overall length of the stem is such that it is readily accessible and it will readily withdraw through the rim aperture in the event of puncture and thus avoid injury to the tube. Accordingly the numerous advantages of the rubber stems for heavy duty service as heretofore proposed have been retained while the difficulties presented by severe conditions of heavy duty service have been avoided by reason of the present invention.

While the embodiment of the present invention illustrated on the drawing has been described with considerable particularity it is to be expressly understood that the invention is not limited thereto, as the invention may receive other mechanical expressions, as will now be apparent to those skilled in the art, while changes may be made in the details of construction, arrangement, proportion, dimensions, etc., without departing from the spirit of this invention. Reference is therefore to be had to the appended claims for a definition of the invention.

What is claimed is:

1. A valve stem including a rubber base flap, a rubber body extending from said flap, a metal insert embedded in said body and extending from at least the tip portion of said body to but not through said flap, said insert having a through passage which is constricted in cross section to provide a shoulder faced toward said flap, a metal member seated against said shoulder and having a length which is less than the length of the portion of said insert which is embedded in said rubber, said metal member having a passage therethrough which is constricted in cross section intermediate its length to provide a shoulder faced toward said flap, the inner edge of said shoulder constituting a valve seat, the inner end of said insert inwardly from the inner end of said metal member being lined with the rubber of said body portion, and valve provisions in said stem including a hollow conical metal valve member making a substantially line contact with said seat, the wall of said valve member being relatively thin so as to be flexible and yieldable into airtight contact with said valve seat.

2. A valve stem including a rubber base flap, a rubber body extending from said flap, a metal insert embedded in said body and extending from at least the tip portion of said body to but not through said flap, said insert at its inner end being provided with an outwardly directed flange projecting into said base flap and having apertures therein through which the rubber of said base flap is integrally united, said insert having a through passage which is constricted in cross section to provide a shoulder faced toward said flap, a metal member seated against said shoulder and having a length which is less than the length of the portion of said insert which is embedded in said rubber, said metal member having a passage therethrough which is constricted in cross section intermediate its length to provide a shoulder faced toward said flap, the inner edge of said shoulder constituting a valve seat, the inner end of said insert inwardly from the inner end of said metal member being lined with the rubber of said body portion, and valve provisions in said stem including a hollow conical metal valve member making a substantially line contact with said seat, the wall of said valve member being relatively thin so as to be flexible and yieldable into airtight contact with said valve seat.

3. A valve stem including a rubber base flap, a rubber body extending from said flap, a metal insert embedded in said body and extending from at least the tip portion of said body to but not through said flap, said insert at its outer end having a tip portion of reduced diameter providing a relatively abrupt shoulder exteriorly of said insert and the rubber of said body portion smoothly merging by means of a curved surface into said shoulder, said insert having a through passage which adjacent the tip of said body is constricted in cross section to provide a shoulder faced toward said flap, a metal member seated against said shoulder and having a length which is less than the length of the portion of said insert which is embedded in said rubber, said metal member having a passage therethrough which is constricted in cross section intermediate its length to provide a shoulder faced toward said flap, the inner edge of said shoulder constituting a valve seat, the inner end of said insert inwardly from the inner end of said metal member being lined with the rubber of said body portion, and valve provisions in said stem including a hollow conical metal valve member making a substantially line contact with said seat, the wall of said valve member being relatively thin so as to be flexible and yieldable into airtight contact with said valve seat.

4. A valve stem including a rubber base flap, a rubber body extending from said flap, a metal insert embedded in said body and extending from at least the tip portion of said body to but not through said flap, said insert having a through passage which is constricted in diameter to provide a shoulder faced toward said flap, a metal member seated against said shoulder and having a length which is less than the length of the portion of said insert which is embedded in said rubber, said metal member having a passage therethrough which is constricted in cross section intermediate its length to provide a shoulder faced toward said flap, the inner edge of said shoulder constituting a valve seat, the inner end of said insert inwardly from the inner end of said metal member being lined with the rubber of said body portion flush with the passage portion of larger cross section in said metal member, and valve provisions in said stem including a hollow conical metal valve member making a substantially line contact with said seat, the wall of said valve member being relatively thin so as to be flexible and yieldable into airtight contact with said valve seat.

5. A valve stem including a rubber base flap, a rubber body extending from said flap, a metal insert embedded in said body and extending from at least the tip portion of said body to but not through said flap, said insert having a through passage which is constricted in cross section to provide a shoulder facing toward said flap, a metal member seated against said shoulder and having a length which is less than the length of the portion of said insert which is embedded in said rubber, said metal member having a passage therethrough which is constricted in cross section intermediate its length to provide a shoulder faced toward said flap, the inner edge of said shoulder constituting a valve seat, the inner end of said insert inwardly from the inner end of said metal member being lined with the rubber of said body portion, valve provisions in said stem including a hollow conical metal valve member making a substantially line contact with said seat, the wall of said valve member being relatively thin so as to be flexible and yieldable into airtight contact with said valve seat, the outer end of said metal member projecting into the passage through said insert to provide an outwardly faced shoulder, a head connected to said valve member and slidably filling the opening in the outer end of said insert, and a coil spring reacting between said head and said last named shoulder and normally urging said valve member into airtight engagement with said seat with said head filling said aperture.

HENRY Z. GORA.